US012559013B2

(12) United States Patent
Akbari Asl et al.

(10) Patent No.: US 12,559,013 B2
(45) Date of Patent: Feb. 24, 2026

(54) BLOOD FLOW ENHANCING COMPONENTS FOR AN AUTOMOTIVE VEHICLE

(71) Applicant: FCA US LLC, Auburn Hills, MI (US)

(72) Inventors: Payam Akbari Asl, LaSalle (CA);
Keith M Wasserman, Gilbraltar, MI (US); Evan J Oswald, Auburn Hills, MI (US); Marcus V Hemmye, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/641,858

(22) Filed: Apr. 22, 2024

(65) Prior Publication Data

US 2025/0326344 A1 Oct. 23, 2025

(51) Int. Cl.
| | |
|---|---|
| B60N 2/90 | (2018.01) |
| A61H 23/02 | (2006.01) |
| B60K 35/10 | (2024.01) |
| B60K 35/28 | (2024.01) |
| B60N 3/06 | (2006.01) |

(52) U.S. Cl.
CPC ......... B60N 2/976 (2018.02); A61H 23/0245 (2013.01); B60K 35/10 (2024.01); B60K 35/28 (2024.01); B60N 3/06 (2013.01); *A61H*

*2201/164* (2013.01); *A61H 2201/5046* (2013.01); *A61H 2203/0431* (2013.01); *A61H 2205/12* (2013.01); *A61H 2209/00* (2013.01); *B60K 2360/1438* (2024.01)

(58) Field of Classification Search
CPC ............... B60N 2/976; A61H 23/0245; A61H 2201/164; A61H 2209/00; B60K 35/10
See application file for complete search history.

(56) References Cited

U.S. PATENT DOCUMENTS

| | | | |
|---|---|---|---|
| 2004/0034314 A1* | 2/2004 | Kobayashi | B60N 2/62 601/5 |
| 2017/0144576 A1* | 5/2017 | Astrike | B60N 3/048 |
| 2017/0228028 A1* | 8/2017 | Nakamura | G06F 3/011 |
| 2018/0022327 A1* | 1/2018 | Kitagawa | G06V 20/56 180/275 |
| 2019/0077289 A1* | 3/2019 | Mergl | B60N 2/976 |

* cited by examiner

*Primary Examiner* — Rochelle D Turchen
(74) *Attorney, Agent, or Firm* — Jeremy J. Klobucar

(57) ABSTRACT

A vehicle includes a first footwell and a first massage housing disposed at the first footwell. The massage housing comprises an upper surface, a lower surface and a first actuator coupled between the upper surface and the lower surface. The first actuator generates movements of the upper surface. A user interface within the vehicle controls the first actuator.

17 Claims, 4 Drawing Sheets

BLOOD FLOW ENHANCING COMPONENTS FOR AN AUTOMOTIVE VEHICLE

FIELD

The present disclosure relates to driver comfort improvements, and, more particularly, to improving the blood flow in the legs of a vehicle occupant.

BACKGROUND

This section provides background information related to the present disclosure which is not necessarily prior art.

Many trips in a vehicle are very short. However, during longer trips, blood flow, especially in the aging population may be reduced. Blood flow in the lower extremities such as the lower leg, especially between the knee and the foot, may be compromised during long journeys.

For long journeys, older people may wear compression socks or compression sleeves. Other ways to increase blood flow that are not necessarily suitable for a vehicle situation include a leg circulation machine, a compression massager or the like.

Many vehicles having massaging seats that massage the lower back and the seat base. There is no known means for massaging the lower extremities during a trip.

SUMMARY

This section provides a general summary of the disclosure and is not a comprehensive disclosure of its full scope or all of its features.

The present system uses a massage housing that is used to increase blood flow during operation of the vehicle.

In one aspect of the disclosure, a vehicle includes a first footwell and a first massage housing disposed at the first footwell. The massage housing comprises an upper surface, a lower surface and a first actuator coupled between the upper surface and the lower surface. The first actuator generates movements of the upper surface. A user interface within the vehicle controls the first actuator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
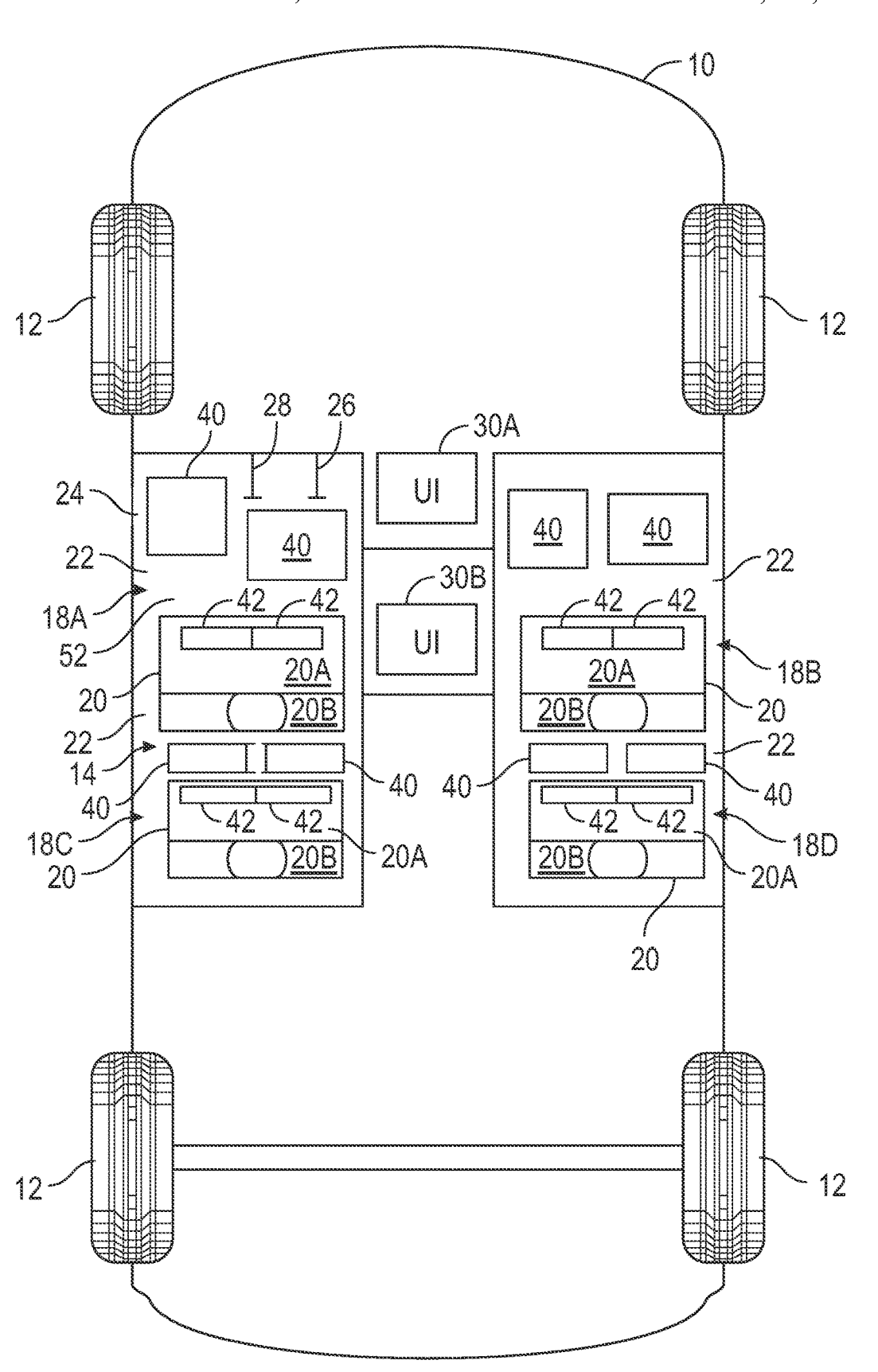
FIG. 1 is a diagrammatic view of a passenger compartment of a vehicle having massage housings according to the present disclosure.

Referring now to FIG. 1, a simplified top view of a vehicle 10 is illustrated. The vehicle 10 has four wheels 12 located near each corner of the vehicle. The vehicle 10 also includes a passenger compartment 14 having a center console 16. The center console 16, in this example, extends from the forward portion of the passenger compartment 14 to the rearward portion. The center console 16 may also be eliminated.

The passenger compartment 14 has four seating positions 18 in this example. The seating positions correspond to a driver seating position 18A, a front passenger seating position 18B, a left rear passenger seating position 18C and a right rear passenger seating position 18D. The seating positions 18A-18D each have a seat 20 corresponding thereto. Each of the plurality of seats may be configured in a similar way. However, it is not uncommon for vehicles to have a different driver seat or front passenger seats compared to the rear seats. A footwell 22 is disposed in front of each of the seats 20. The footwell 22 is formed by the floor pan 24 of the vehicle 10. Front footwell and rear footwells are formed. The driver seating position 18A may also be associated with an acceleration pedal 26 and a brake pedal 28. The steering wheel and other components have not been illustrated to simplify the figure.

A user interface 30A is associated with the front passengers of the vehicle 10. The user interface 30A may be touch screen, switches, dials, knobs or the like. A user interface 30B is associated with the rear passengers and may be configured with the same or different types of elements such as a touch screen, switches, dials, knobs, and buttons. The user interface 30 is used to control massage housings 40. The massage housings, as will be described in greater detail below, have an actuator that is used to generate movements of an upper surface thereof. In FIG. 1, two massage housings 40 are located in the footwells 22 of each of the seating positions 18A-18D. Massage housings 40 may be combined to form one rectangle as illustrated by the dashed lines in front of the left rear passenger seating position 18C. In this example, providing two massage housings 40 for each of the seating positions 18A-18D, allow each foot of a passenger to have separately controlled massage housings 40 and separately controlled movements thereof. For the driver seating position 18A, the massage housings 40 may have one positioned adjacent to (or behind relative to the vehicle 10) the accelerator pedal 26 and the brake pedal 28. The massage housings 40 may be located horizontally or on an angled surface within the footwell 22 that corresponds to the angle of the floor plan 24.

The seats 20 may also have one or more seat massage housings 42. The seat massage housings 42 may be positioned in the seat base 20A. The position of the seat massage housings 42 are toward a front edge 58 of the seat base 20A relative to the direction of the vehicle. By controlling the settings at the user interface 30A, 30B, the floor massage housings 40 and the seat massage housing 42 may increase the blood flow of the extremities of a passenger in the vehicle. The seat housings 42 are in a position to be contacted or adjacent to the occupant's thighs. The seat massage housings 42 may be controlled to have synchronized movement or non-synchronization movement. The position of the floor massages housings 40 may be within or below the carpeting 52 of the floor pan 24 within the footwell 22. The seat massage housings 42 may be within the seat material below the outer fabric.

Figure 2A:
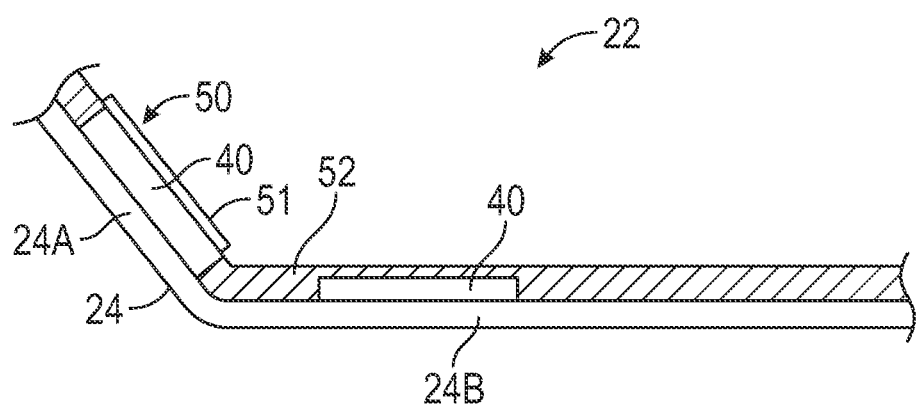
FIG. 2A is a cross-sectional view of a portion of a floor panel of a vehicle having massage housings.

Referring now to FIG. 2A, details of two positions of floor massage housings 40 are illustrated. The floor massage housings 40 may be positioned at a footrest position 50. The footrest position 50 may be a separate material or the outer layer of the floor massage housing may act as a foot pedal 51. In the case of the foot pedal 51, carpeting 52 disposed on the floor pan 24 and, in particular, the angular portion 24A of the floor pan 24 may be discontinuous so that the massage housing 40 and/or the foot pedal 51 are exposed.

A floor massage housing 40 may also be disposed on a horizontal portion 24B of the floor pan. The floor massage housing 40, in this example, is covered in carpeting 52. The carpeting 52 may be thinned over the floor massage housing 40 so that a smooth surface is obtained on the top of the carpeting 52.

Figure 2B:
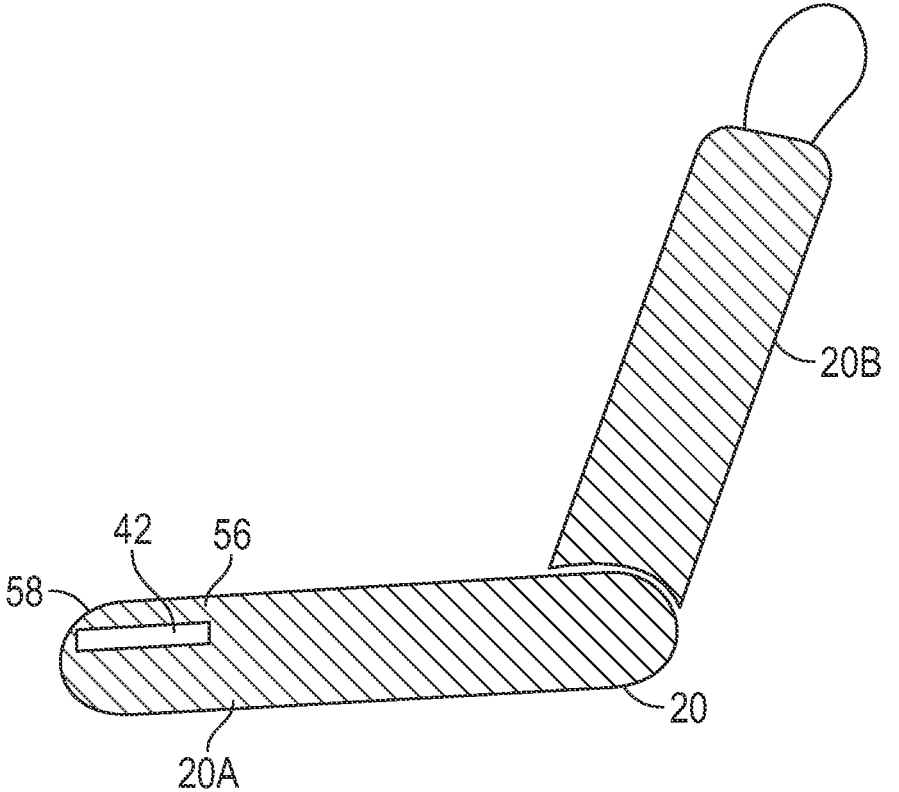
FIG. 2B is a cross-sectional view of a seat having a massage housing in the seat base.

Referring now to FIG. 2B, a seat 20 is illustrated having the seat massage housing 42 positioned therein. The seat massage housing 42 may extend across the seat base 20A. Some cushion or material 56 may be disposed on the seat base 20A and over the seat massage housing 42 to provide a finished surface.

Figure 3A:
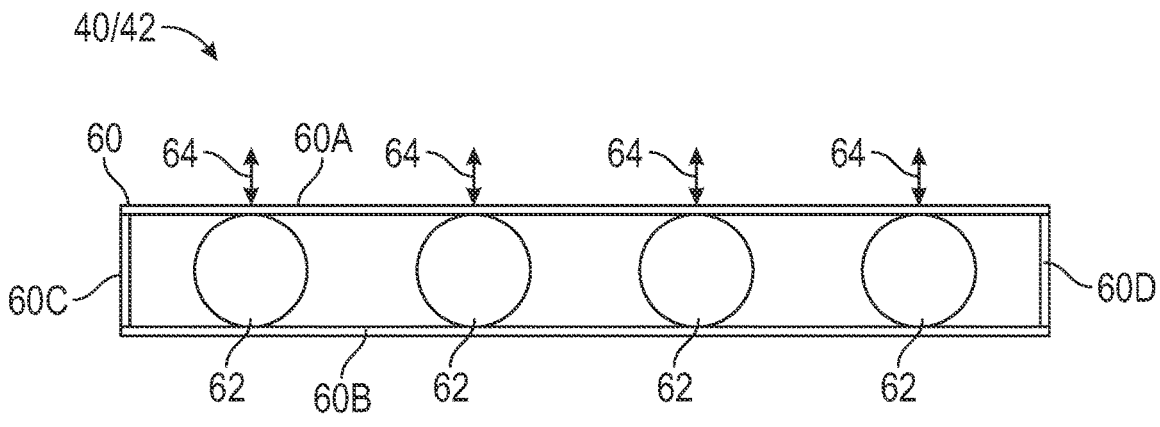
FIG. 3A is a cross-sectional view of a massage housing.
Figure 3B:
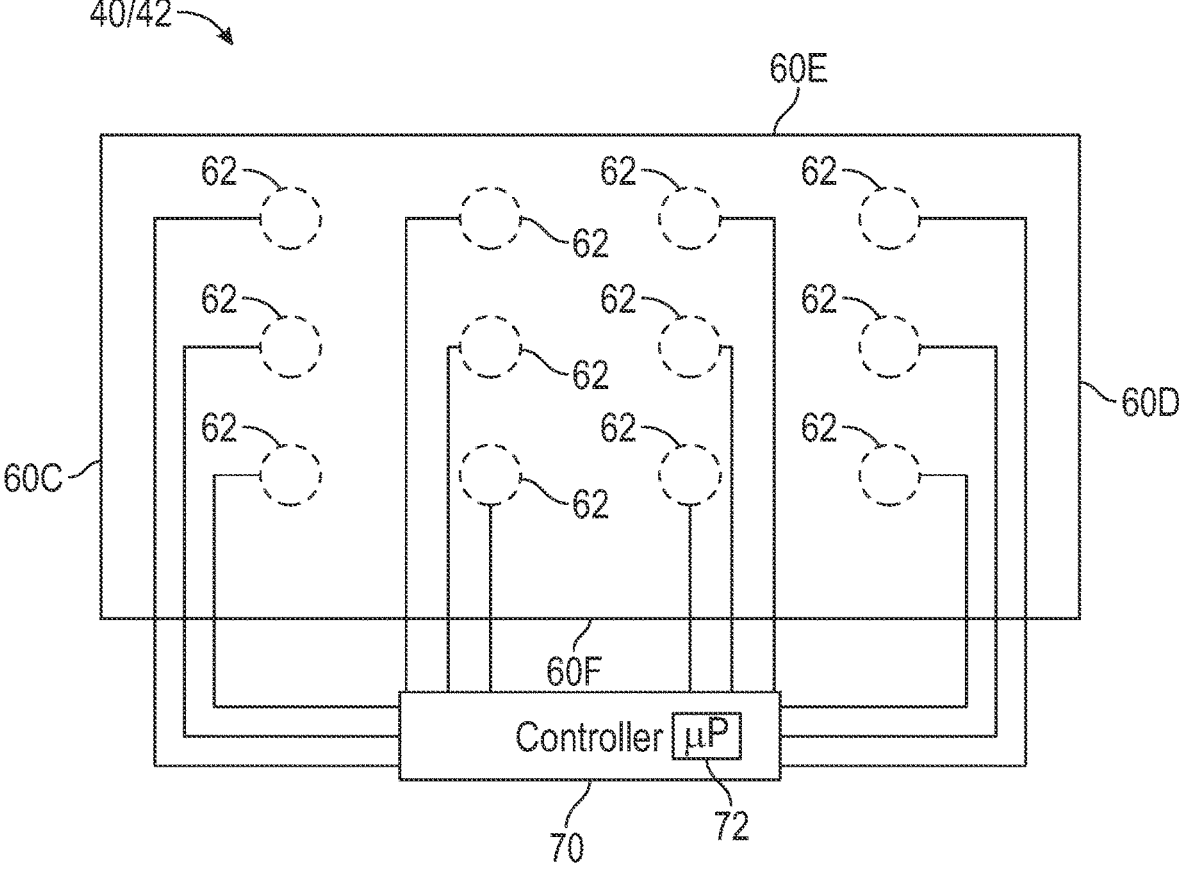
FIG. 3B is a top view illustrating the actuators in an array for the massage housing.

Referring now to FIGS. 3A and 3B, the floor massage housing 40 and the seat massage housing 42 may be configured in a similar manner and therefore illustrated together. The floor massage housing 40 and the seat massage housing 42 will be referred to as having a housing 60. The housing 60 has a top wall 60A, a bottom wall 60B, a sidewall 60C and a sidewall 60D. Further, sidewalls 60E and 60F are illustrated in FIG. 3B. The housing 60 has a plurality of actuators 62 disposed therein. The actuators 62 move the upper walls 60A in the direction illustrated by the arrows 64. The actuators 62 are set forth in an array. In this example, twelve actuators are illustrated. However, various numbers of actuators may be used. The actuators 62 may be operated at different times and at different rates so that a massaging feeling when a passenger places their foot or thighs adjacent to the upper surface 60A of the housing 60. The upper surface 60A may move the carpeting, material in a seat, a cushion of the seat or a foot pedal 51.

The actuators 62 may use various types of technologies including motors that move magnets, ultrasonic actuators, hydraulic actuators or the like. The actuator 62 may be controlled in various patterns by a controller 70. The controller 70 may have a microprocessor 72 therein that is programmed to perform the desired movement or provide an intensity of speed of the movements. As mentioned above, the movement may be performed by controlling the actuators to move in a predetermined way to obtain the desired amount of movement and intensity of the movement which, in turn, provides the passenger with desired blood flow in the extremities, such as the foot, lower leg and thighs. The controller 70 may control one or all of the massage housings 40, 42. The massage housings 40, 42 may be independently controlled or synchronize controlled to improve blood flow in the extremities.

Figure 4A:
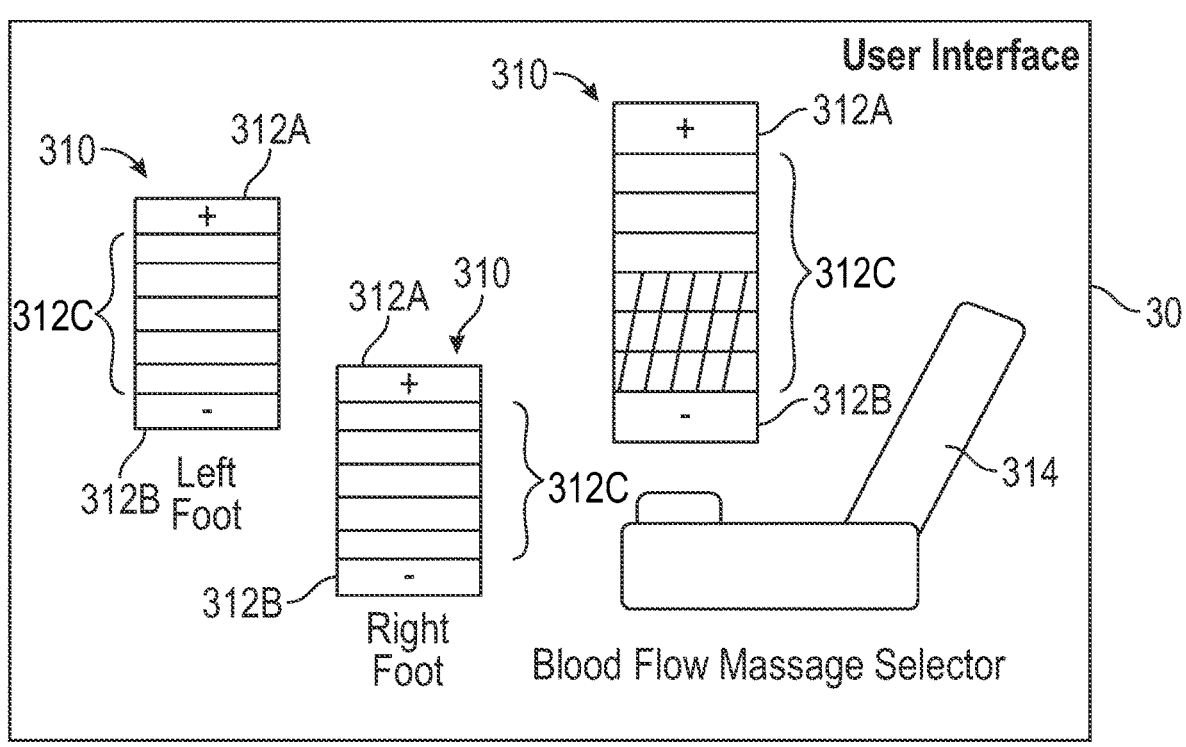
FIG. 4A is a first example of a user interface using a touch screen display.

Referring now to FIG. 4A, one example of a user interface 30 is set forth. The user interface 30 comprises a plurality of graphic groups 310 that include a first touch button 312A for increasing the speed or intensity of the massaging. A second touch button 312B is used for decreasing the intensity or speed of the massaging. An indicator portion 312C, in this example, is disposed between the touch button 312A and the touch button 312B. The indicator 312C may illuminate, generate or provide a different color to show the intensity of the massage or the speed of the massage. A graphic 314 may be used to indicate the position of the housing that is controlled by the user interface. The graphic 314, in this example, corresponds to the massage housing 42 within the seat base 20A.

Figure 4B:
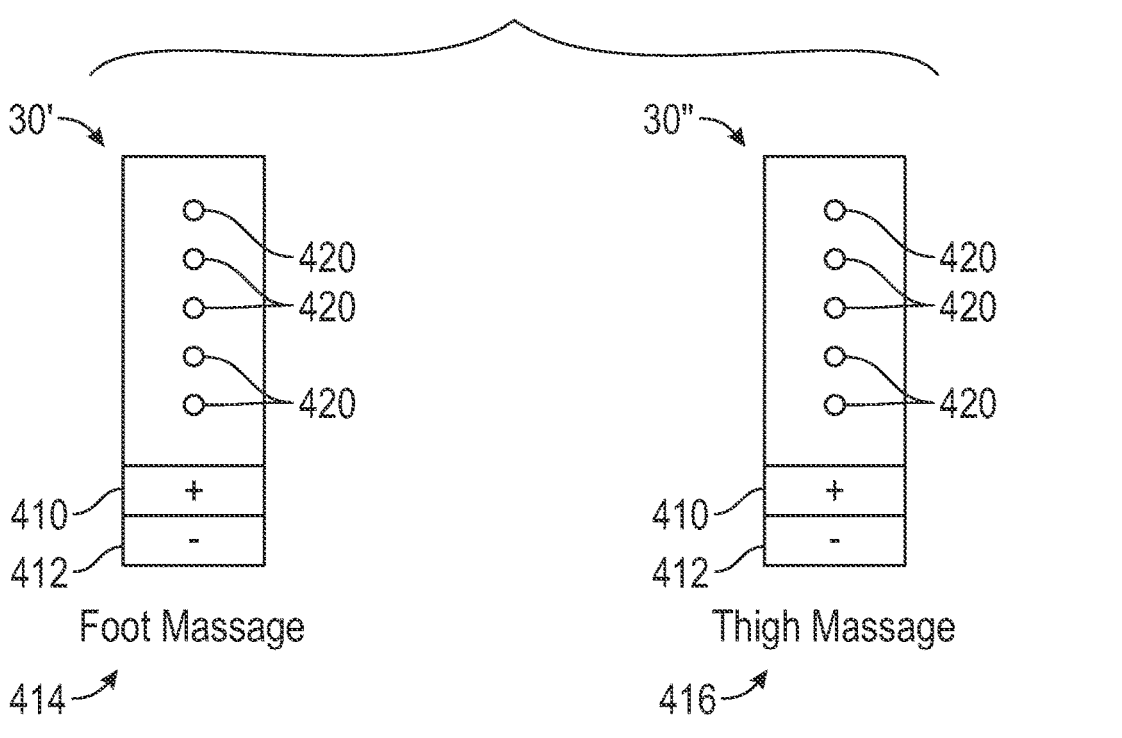
FIG. 4B is a second example of a user interface using switches.

Referring now to FIG. 4B, two user interfaces 30' and 30" are set forth. In this example, control buttons 410 and 412 are illustrated. The buttons 410 and 412 are switches used for increasing the intensity or speed at button 410 or decreasing the speed of the massage at button 412. A graphic 414 informs the user that the switches 410 or 412 are for either a foot massage by the message 414 or for a thigh massage by the message 416. Each set of switches 410, 412 may have indicators 420 that correspond to the intensity or speed of the massage.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
a first footwell formed within a floor pan of the vehicle;
a foot pedal disposed in the footwell;
a first massage housing disposed at the first footwell, said massage housing comprising an upper surface coupled to the foot pedal, a lower surface coupled to the floor pan and a first actuator coupled between the upper surface and the lower surface, said first actuator generating movements of the upper surface; and
a user interface within the vehicle controls the first actuator.

2. The vehicle of claim 1 wherein the first massage housing is disposed with carpeting therearound.

3. The vehicle of claim 1 wherein the first actuator comprises an ultrasonic actuator.

4. The vehicle of claim 1 wherein the first actuator comprises a motor.

5. The vehicle of claim 1 wherein the user interface comprises a touch screen.

6. The vehicle of claim 1 wherein the user interface comprises a switch.

7. The vehicle of claim 1 wherein the user interface controls an amount of movement or intensity.

8. The vehicle of claim 7 wherein the user interface displays the amount of movement or intensity.

9. The vehicle of claim 1 wherein the first actuator comprises a plurality of actuators.

10. The vehicle of claim 9 wherein the plurality of actuators is disposed in an array.

11. The vehicle of claim 10 further comprising a second massage housing disposed in the footwell.

12. The vehicle of claim 1 further comprising:
a first seat; and
wherein the first footwell and the first massage housing are disposed in front of the first seat.

13. The vehicle of claim 12 further comprising a second footwell and a second seat in front of the second footwell and a second housing comprising a second actuator disposed in the first footwell.

14. The vehicle of claim 13 wherein the user interface controls the first actuator and the second actuator.

15. The vehicle of claim 12 further comprising a seat massage housing disposed in a seat base at a front edge thereof.

16. The vehicle of claim 12 further comprising a rear seat comprising a rear footwell and a rear massage housing disposed in the rear footwell.

17. The vehicle of claim 16 further comprising a rear user interface controlling a movement or intensity of a rear actuator in a rear massage housing.

* * * * *